(12) United States Patent  
Wang et al.

(10) Patent No.: US 10,445,734 B2  
(45) Date of Patent: Oct. 15, 2019

(54) METHOD AND APPARATUS OF IDENTIFYING A TRANSACTION RISK

(71) Applicant: Alibaba Group Holding Limited, Grand Cayman (KY)

(72) Inventors: Fengwei Wang, Chengdu (CN); Huimei He, Chengdu (CN); Dijun He, Chengdu (CN); Renxin Mao, Chengdu (CN)

(73) Assignee: Alibaba Group Holding Limited, Grand Cayman (KY)

( * ) Notice: Subject to any disclaimer, the term of this patent is extended or adjusted under 35 U.S.C. 154(b) by 450 days.

(21) Appl. No.: 14/819,289

(22) Filed: Aug. 5, 2015

(65) Prior Publication Data

US 2016/0042355 A1 Feb. 11, 2016

(30) Foreign Application Priority Data

Aug. 6, 2014 (CN) .......................... 2014 1 0383966

(51) Int. Cl.
*G06Q 20/40* (2012.01)

(52) U.S. Cl.
CPC ..... *G06Q 20/4016* (2013.01); *G06Q 20/4014* (2013.01)

(58) Field of Classification Search
CPC ..................................................... G06Q 20/40
USPC ......................................................... 705/39
See application file for complete search history.

(56) References Cited

U.S. PATENT DOCUMENTS

| 7,458,508 | B1 | 12/2008 | Shao et al. |
| 7,793,835 | B1 | 9/2010 | Coggeshall et al. |
| 8,966,640 | B1 | 2/2015 | Peddada et al. |
| 2006/0149674 | A1* | 7/2006 | Cook .................. G06Q 20/40 705/44 |
| 2006/0212932 | A1 | 9/2006 | Patrick et al. |
| 2008/0275821 | A1* | 11/2008 | Bishop ................ G06Q 20/10 705/64 |

(Continued)

OTHER PUBLICATIONS

PCT Search Report and Written Opinion dated Apr. 4, 2016 for PCT Application No. PCT/US15/43859, 8 pages.

(Continued)

*Primary Examiner* — Robert R Niquette
(74) *Attorney, Agent, or Firm* — Lee & Hayes, P.C.

(57) ABSTRACT

A method and an apparatus for identifying a transaction risk are disclosed. The method includes obtaining risk identification information of a sub-network to which a node relating to a transaction to be identified belongs; and identifying a risk of the transaction to be identified based on the risk identification information of the sub-network to which the node relating to the transaction to be identified belongs, wherein the sub-network is a network acquired by partitioning a relationship network based on connectivity, the relationship network is a network built up with entities and activities relating to a plurality of transactions. Embodiments of the present disclosure build up entities and activities relating to a transaction to be identified into a relationship network, and identify whether a risk exists in the transaction to be identified using risk identification information of the network which is difficult to be found or changed, and thus are able to identify a transaction risk in a more effective manner.

20 Claims, 5 Drawing Sheets

(56) References Cited

U.S. PATENT DOCUMENTS

| | | | |
|---|---|---|---|
| 2011/0276468 A1* | 11/2011 | Lewis | G06Q 10/0635 705/38 |
| 2012/0030083 A1* | 2/2012 | Newman | G06Q 40/00 705/35 |
| 2014/0058914 A1* | 2/2014 | Song | G06Q 40/06 705/35 |
| 2014/0180974 A1* | 6/2014 | Kennel | G06N 7/005 706/12 |
| 2014/0250016 A1* | 9/2014 | Kranzley | G06Q 20/4016 705/44 |
| 2015/0052050 A1* | 2/2015 | Mankad | G06Q 20/4016 705/42 |
| 2015/0161609 A1* | 6/2015 | Christner | G06Q 20/4016 705/44 |

OTHER PUBLICATIONS

Machine translation of the first Chinese Office Action dated Sep. 21, 2018 for Chinese patent application No. 201410383966.8, a foreign counterpart application of U.S. Appl. No. 14/819,289, 5 pages.

* cited by examiner

METHOD AND APPARATUS OF IDENTIFYING A TRANSACTION RISK

CROSS REFERENCE TO RELATED PATENT APPLICATION

This application claims foreign priority to Chinese Patent Application No. 201410383966.8 filed on Aug. 6, 2014, entitled "Method and Apparatus of Identifying a Transaction Risk", which is hereby incorporated by reference in its entirety.

TECHNICAL FIELD

The present disclosure relates to the field of computer technologies, and more particularly, to methods and apparatuses for identifying a transaction risk.

BACKGROUND

With the rapid development of the open Internet system, the application and expansion of electronic commerce has greatly changed people's work and lifestyles. As a new form of business method, electronic commerce has brought manufacturing enterprises, logistics enterprises, consumers and governments into a new era of network economy and digital life. Under an environment of electronic commerce, people no longer suffer from territory limitations, and clients can easily complete commercial activities that were complicated in the past. For example, funds can be deposited into and withdrawn from accounts via online banking, and information can be inquired at any time. Meanwhile, the quality of customer service of enterprises has been greatly enhanced.

In electronic commerce, security is a crucial and key issue. Identifying a security risk in an electronic commerce transaction timely and accurately is the basis of guaranteeing a secure transaction of an electronic commerce system. A process of identifying a security risk in a transaction is a process that identifies a security risk that may pose a potential threat to the transaction through collection of information such as various types of threats, bugs and related countermeasures, etc.

When identifying a transaction risk, an existing electronic commerce system sets up a rule according to a property of an event behavior, and identifies whether a risk exists in each transaction based on the rule. For example, a transaction risk may be identified based on a property associated with a transaction amount. Specifically, since a normal transaction amount for users is less than three hundred dollars, a risk is said to exist in a transaction if an amount associated with the transaction is greater than three hundred dollars.

In the above method for identifying a transaction risk, a rule that is set up is easy to be discovered, and malicious users can sidestep the rule easily. At that time, a transaction risk may not be effectively identified.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a transaction risk identification method, which is used for effectively identifying a transaction risk.

The embodiments of the present disclosure further provide a transaction risk identification apparatus for identifying a transaction risk effectively.

The embodiments of the present disclosure employ technical solutions as follows.

A method of identifying a transaction risk, which includes obtaining risk identification information of a sub-network to which a node relating to a transaction to be identified belongs, the risk identification information of the sub-network including a static property of the sub-network and/or dynamic change information of the sub-network caused by the transaction to be identified, and identifying a risk of the transaction to be identified based on the risk identification information of the sub-network to which the node relating to the transaction to be identified belongs, wherein the sub-network is a network obtained by partitioning a relationship network based on connectivity, and the relationship network is a network built up of entities and activities relating to a plurality of transactions.

An apparatus of identifying a transaction risk, which includes an acquisition unit to obtain risk identification information of a sub-network to which a node relating to a transaction to be identified belongs, the risk identification information of the sub-network including a static property of the sub-network and/or dynamic change information of the sub-network caused by the transaction to be identified; and a risk identification unit to identify a risk of the transaction to be identified based on the risk identification information of the sub-network to which the node relating to the transaction to be identified belongs, wherein the sub-network is a network obtained by partitioning a relationship network based on connectivity, and the relationship network is a network built up of entities and activities relating to a plurality of transactions.

At least one of the technical solutions used in the embodiments of the present disclosure can achieve beneficial effects as follows:

The embodiments of the present disclosure build entities and activities relating to a transaction to be identified into a relationship network, and identify whether a risk in the transaction to be identified exists through risk identification information of the network. As the risk identification information of the network is difficult to be found or changed, the embodiments of the present disclosure can identify a transaction risk in a more effective manner.

DESCRIPTION OF THE DRAWINGS

The drawings described herein are used for providing a further understanding of the present disclosure, and constitute a part of the present disclosure. Exemplary embodiments of the present disclosure and a description thereof are used for illustrating the present disclosure and are not intended to form limitations to the present disclosure. In the drawings.

DETAILED DESCRIPTION

In order to facilitate understanding of objectives, technical solutions, and advantages of the embodiments of the present disclosure in a clear manner, the technical solutions of the present disclosure are clearly and fully described herein in conjunction with exemplary embodiments and corresponding accompanying drawings of the present disclosure. Apparently, the described embodiments merely represent a part and not all of the embodiments of the present disclosure. All other embodiments acquired by one of ordinary skill in the art based on the embodiments of the present disclosure without making any creative effort shall fall within the scope of protection of the present disclosure.

The technical solutions of the embodiments of the present disclosure are described herein in further detail with reference to the accompanying drawings.

Figure 1:
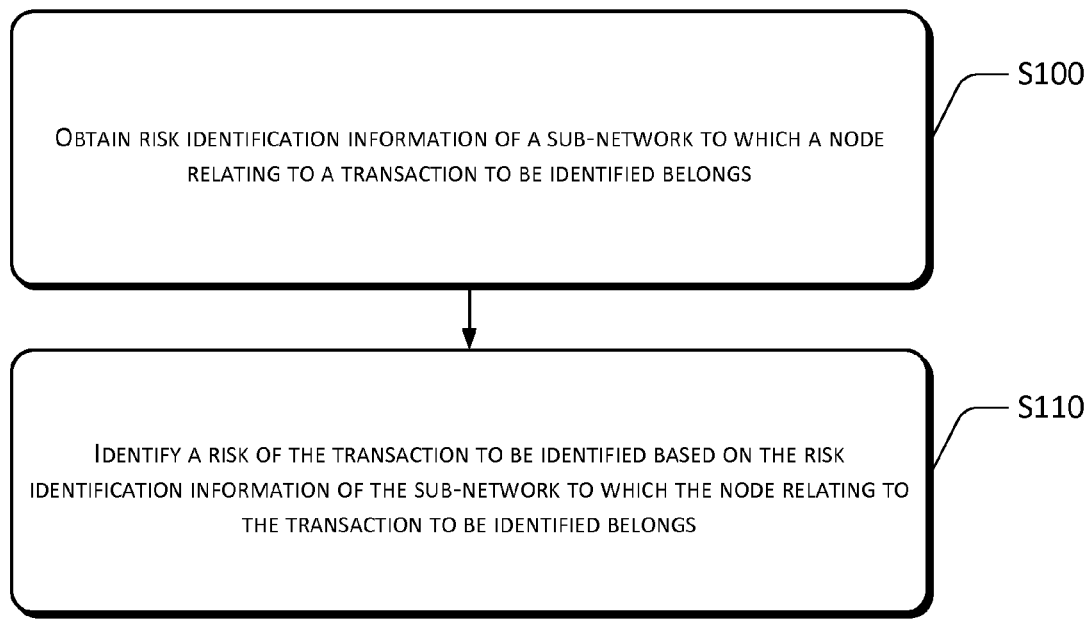
FIG. 1 is a flowchart illustrating operations of a method of identifying a transaction risk according to an embodiment of the present disclosure.

The embodiments of the present disclosure provide a method that identifies a transaction risk. FIG. 1 shows a flowchart illustrating operations of the method for identifying a transaction risk, which includes the following operations:

S100 obtains risk identification information of a sub-network to which a node relating to a transaction to be identified belongs.

The risk identification information of the sub-network according to the embodiments of the present disclosure includes a static property of the sub-network and/or dynamic change information of the sub-network caused by the transaction to be identified.

The sub-network is a network acquired by partitioning a relationship network based on connectivity. The relationship network is a network built up with entities and activities relating to a plurality of transactions. The entities relating to the plurality of transactions are used as nodes in the relationship network, and the activities relating to the plurality of transactions are used as edges for connecting the nodes in the relationship network.

A method for building a relationship network according to the embodiments of the present disclosure may include building entities and activities relating to a plurality of transactions into a relationship network, the entities relating to the plurality of transactions being used as nodes in the relationship network, the activities relating to the plurality of transactions being used as edges for connecting the nodes in the relationship network, and the plurality of transactions including any transaction in an electronic commerce system.

According to the embodiments of the present disclosure, Information for identifying the entities relating to the plurality of transactions may include at least one or more of: a user identifier (ID), a delivery address, a phone number, a bank card used in a transaction, a Unique Material Identifier (UMID), and a Media Access Control (MAC) address.

According to the embodiments of the present disclosure, the activities relating to the plurality of transactions may include at least one or more of a transaction, a registration, and a login.

The embodiments of the present disclosure may firstly add node(s) relating to the transaction to be identified into the relationship network, partition the node(s) relating to the transaction to be identified into a sub-network based on connectivity, and obtain risk identification information of the sub-network to which the node(s) relating to the transaction to be identified belong(s).

It can be understood that the entities and the activities relating to the plurality of transactions described in the present disclosure are not limited to the foregoing, and the foregoing is merely some examples of the embodiments.

By building a relationship network, the embodiments of the present disclosure may build entities and activities relating to a plurality of transactions into the relationship network, thus facilitating a comprehensive analysis and identification of a transaction to be identified in a process of transaction risk identification.

A method of partitioning a relationship network into a plurality of sub-networks according to the embodiments of the present disclosure may include partitioning a relationship network into a plurality of unconnected sub-networks based on connectivity, with each sub-network having a serial number that is unique to the entire relationship network, where a group partition algorithm may be used to partition the relationship network into the plurality of unconnected sub-networks based on the connectivity, i.e., dividing nodes that are connected directly or indirectly into a sub-network.

The embodiments of the present disclosure may perform the operation of partitioning the relationship network into the plurality of unconnected sub-networks in real time or at fixed time intervals. For example, the group partition algorithm may be set to partition a relationship network into a plurality of unconnected sub-networks in every five hours, every twelve hours, or every twenty-four hours. For another example, the group partition algorithm may be employed to partition the relationship network into the plurality of unconnected sub-networks in real time.

Figure 2:
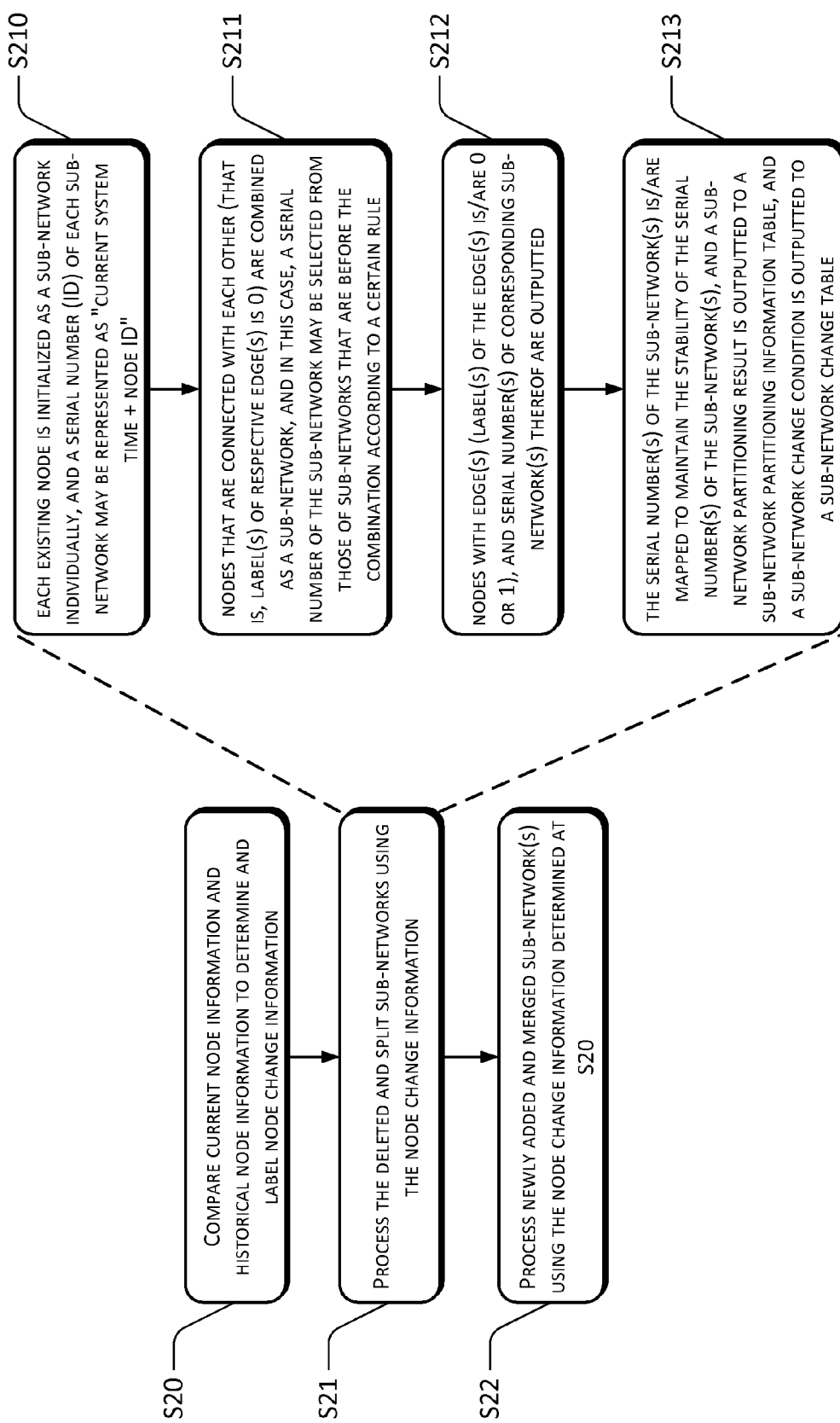
FIG. 2 is a flowchart illustrating operations of partitioning a relationship network into a plurality of unconnected sub-networks by applying a group partition algorithm according to an embodiment of the present disclosure.

Operations of a method of applying a group partition algorithm to partition a relationship network into a plurality of unconnected sub-networks according to the embodiment is shown in FIG. 2, which may include:

S20 compares current node information and historical node information to determine and label node change information.

The current node information includes information of all node relationship pairs in the current relationship network. The historical node information includes information of all node relationship pairs in the relationship network last time when the operation of partitioning the relationship network (that is, the operation of partitioning the relationship network into the plurality of sub-networks) is performed. The node change information includes newly added nodes and edges, existing nodes and edges, and/or deleted nodes and edges, upon comparison between the current node information and the historical node information. The following approach may be used to label the node change information:

labeling the newly added nodes and edges as 1;
labeling the existing nodes and edges as 0; and
labeling the deleted nodes and edges as −1.

S21 processes the deleted and split sub-networks using the node change information.

According to the embodiments of the present disclosure, a method for processing deleted and split sub-networks may include deleting a subset of nodes and edges, which includes a deletion of the newly added nodes and edges and the deleted nodes and edges; and performing a group partition algorithm on the rest of the existing nodes and edges. Since a deletion of nodes and edges may cause a deletion of sub-network(s) or cause a splitting of a sub-network, and an addition of new nodes and edges may cause an addition of a new sub-network or a merging of sub-networks, the newly added nodes and edges are deleted first at this method block, and operations at this method block involves neither an addition of a new sub-network nor a merging of sub-networks.

The deletion of a subset of nodes and edges may include deleting nodes and edges that are marked as −1 or 1, for example. The remaining nodes and edges are existing nodes and edges that are marked as 0.

Operations of an exemplary method of performing a group partition algorithm on remaining existing nodes and edges may include:

At S210, each existing node is initialized as a sub-network individually, and a serial number (ID) of each sub-network may be represented as "current system time+node ID".

At S211, nodes that are connected with each other (that is, label(s) of respective edge(s) is 0) are combined as a sub-network, and in this case, a serial number of the sub-network may be selected from those of sub-networks that are before the combination according to a certain rule.

At S212, nodes with edge(s) (label(s) of the edge(s) is/are 0 or 1), and serial number(s) of corresponding sub-network(s) thereof are outputted.

An output node may be represented as <node ID, sub-network ID>.

At S213, the serial number(s) of the sub-network(s) is/are mapped to maintain the stability of the serial number(s) of the sub-network(s), and a sub-network partitioning result is outputted to a sub-network partitioning information table, and a sub-network change condition is outputted to a sub-network change table.

This method block is used for adjusting a serial number of a sub-network. At S211, each sub-network after combination has a serial number. In order to keep the serial number of the sub-network stable and facilitate a subsequent relationship query, the embodiments of the present disclosure may perform an operation as follows: conducting statistical analysis of a condition of splitting of each sub-network with reference to a historical sub-network partitioning information table (a previous sub-network partitioning information table), enabling a serial number of the largest sub-network after the splitting to inherit a serial number of a sub-network before the splitting to keep the serial number of the sub-network steady. Specifically, two or more sub-networks may be acquired from splitting of a single sub-network among sub-networks combined at S211. In this case, in order to keep a serial number of the sub-network steady, a serial number of the largest sub-network after the splitting inherits the serial number of the sub-network before the splitting.

According to the embodiments of the present disclosure, the largest sub-network corresponds to a sub-network that includes the most number of nodes. If multiple largest sub-networks exist, a serial number of a sub-network is selected at random to inherit the number of the sub-network before the splitting.

The sub-network partition result, that is, node(s) after the serial number(s) of sub-network(s) is/are mapped, may be represented as <node ID, sub-network ID>. The node is added into the sub-network partition information table.

The sub-network change includes a deletion of a sub-network and a splitting of a sub-network. A deletion of a sub-network may be represented as <original sub-network ID, NULL, deletion identifier>. A splitting of a sub-network may be represented as <original sub-network ID, split sub-network ID, splitting identifier>.

S22 processes newly added and merged sub-network(s) using the node change information determined at S20.

According to the embodiments of the present disclosure, a method of processing the newly added and merged sub-network(s) may include deleting the deleted nodes and edges, and performing a group partition algorithm on the remaining newly added nodes and edges, and the remaining existing nodes and edges.

Deleting the deleted nodes and edges may include deleting nodes and edges that are marked as −1, for example. The remaining nodes and edges are the existing nodes and edges, and the newly added nodes and edges, which are marked as 0 or 1.

For details of the operation of running the group partition algorithm on the remaining newly added and existing nodes and edges, reference may be made to FIG. 2 and a description thereof, which are not repeatedly described herein. In the operation of mapping the serial number(s) of the sub-network(s) and keeping the stability of the serial number(s) of the sub-network(s), since this method block only involves adding new sub-network(s) and merging sub-networks, a statistical analysis may be performed on a merging condition of each sub-network with reference to the historical sub-network partitioning information table, and a serial number of a merged sub-network inherits a serial number of the largest sub-network before the merging. If multiple largest sub-networks exist before the merging, a serial number of one of the largest sub-networks may be selected at random to be inherited. The sub-network partitioning result is then outputted to the sub-network partitioning information table, and the sub-network change condition is outputted to the sub-network change table.

The sub-network change condition includes an addition of new sub-network(s) and a merging of sub-networks. An addition of a new sub-network may be represented as <NULL, newly added sub-network ID, newly added identifier>, and a merging of sub-networks may be represented as <original sub-network ID, merged sub-network ID, merging identifier>.

It can be understood that no restriction is made on an order of performing S21 and S22. In other words, the newly added sub-networks and the merged sub-networks may be processed first, and the deleted sub-network and the split sub-network are then processed.

The above operations complete the partitioning of a sub-network. According to the embodiment of the present disclosure, the sub-network may include at least one or more of static properties as follows:

a number of nodes, a number of edges included in the sub-network, a number of events in the sub-network, and a number of paths where the shortest path between any two nodes in the sub-network is less than a set threshold. The number of events in the sub-network refers to a number of nodes having an occurrence of an event in the sub-network. A node having an occurrence of an event corresponds to a node that belongs to a transaction that is considered as a risky transaction, and such node is a risk node.

According to the embodiments of the present disclosure, the shortest path between any two nodes in the sub-network may be calculated using a shortest path algorithm. Calculating the shortest path between any two nodes may facilitate conducting a relationship query at a subsequent stage. A method of calculating the shortest path between any two nodes in a sub-network using a shortest path algorithm according to the embodiment of the present disclosure may include:

First, if a length of a path between two nodes is a number of non-terminal nodes (that is, intermediate nodes) on the path, a path length for a path between two directly connected nodes is zero because no non-terminal node exist in such path. Since each edge of the sub-network is an edge connecting two directly connected nodes and no non-terminal node exists on the edge, each edge is the shortest path with a length of zero. It should be noted that: for the non-terminal node, for example, a node B via which a node A and a node C are connected, the node A and the node C are terminal nodes, and the node B is a non-terminal node (that is, an intermediate node) when the shortest path between the node A and the node C is calculated.

The shortest path between indirectly connected nodes may then be calculated using a "binding" method. The node A is assumed to bind the adjacent node B with the adjacent node C, that is, to establish a path connection between the node B and the node C via the node A. If a path connection has already been established between the node B and the node C, a binding operation is not performed. Otherwise, the binding operation is performed. The "binding" method may include the following sub-blocks:

At sub-block a, a shortest path connection between the node B and the node C is established via the node A.

At sub-block b, the shortest path between the node B and the node C is calculated, where the shortest path between the node B and the node C=a path from the node B to the node A+a path from the node A to the node C+1.

At sub-block c, an edge between the node B and the node C is established, and the shortest path between the node B and the node C is stored on the edge.

By repeatedly performing the above operations, the shortest path between any two nodes in the sub-network may be calculated, thereby acquiring the number of paths where the shortest path is less than the set threshold.

According to the embodiments of the present disclosure, at least one or more of dynamic changes in the sub-network may happen as follows:
  an addition of a new sub-network: a new sub-network may be added if a new transaction is produced, for example;
  a deletion of a sub-network: a sub-network is deleted when all nodes in the sub-network are deleted, where deleting the nodes includes: (a) identifying a node as a risk node and deleting the risk node; (b) deleting expired node(s) according to a rule, for example, deleting node(s) relating to a transaction that occurred one year ago, and it can be understood that corresponding edge(s) is/are also deleted when the expired node(s) is/are deleted;
  a merging of sub-networks: a new transaction causes nodes in at least two sub-networks to be connected, i.e., an activity between the nodes in the at least two sub-networks is produced, and the at least two sub-networks are merged; and
  a splitting of a sub-network: deleting a portion of nodes or edges in a sub-network may cause some nodes in the sub-network to become independent sub-networks, i.e., a sub-network is split into at least two sub-networks.

According to the embodiments of the present disclosure, the sub-network possesses a serial number that is unique in the entire relationship network. When a dynamic change happens in the sub-network, an exemplary method of keeping the serial number of the sub-network steady may include:
  in case of adding a new sub-network, randomly generating a serial number that is unique in the entire relationship network for the newly added sub-network;
  in case of deleting a sub-network, deleting a serial number of the deleted sub-network;
  in case of merging sub-networks, enabling a serial number of a merged sub-network to inherit a serial number of the largest one of the sub-networks that are before the merging.
  in case of splitting a sub-network, enabling a serial number of the largest one of sub-networks after the splitting to inherit a serial number of the sub-network before the splitting.

The embodiments of the present disclosure facilitate a reverse query operation in subsequent risk identification by maintaining the stability of the serial number of the sub-network.

S110 identifies a risk of the transaction to be identified based on the risk identification information of the sub-network to which the node relating to the transaction to be identified belongs.

Figure 3:
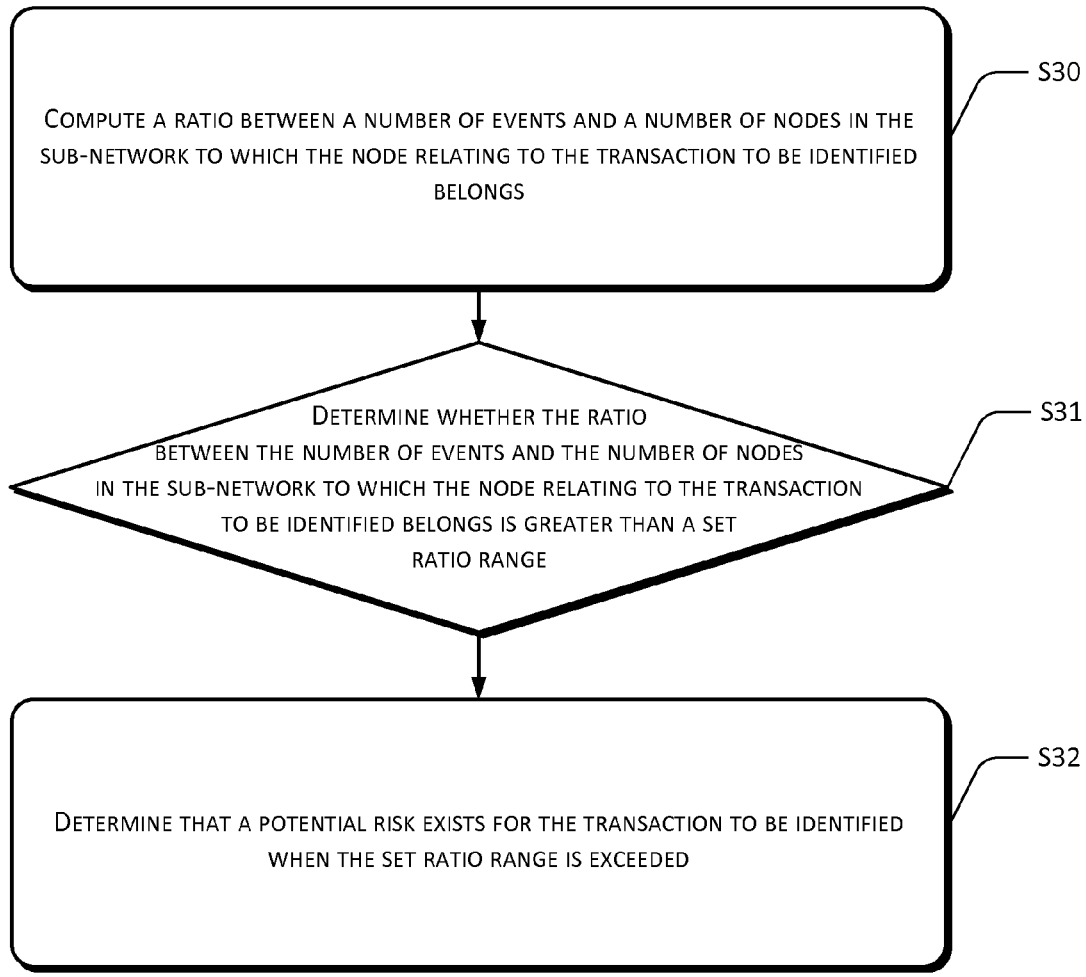
FIG. 3 is a flowchart illustrating operations of identifying a risk of a transaction through a static property of a sub-network to which a node relating to the transaction belongs according to an embodiment of the present disclosure.

In an embodiment of the present disclosure, if the risk identification information of the sub-network, to which the node relating to the transaction to be identified belongs, obtained at S100, includes a static property of the sub-network to which the node relating to the transaction to be identified belongs, the method of identifying the risk of the transaction to be identified based on the risk identification information of the sub-network to which the node relating to the transaction to be identified belongs may include, as shown in FIG. 3, the following blocks:

S30 computes a ratio between a number of events and a number of nodes in the sub-network to which the node relating to the transaction to be identified belongs.

S31 determines whether the ratio between the number of events and the number of nodes in the sub-network to which the node relating to the transaction to be identified belongs is greater than a set ratio range.

As mentioned above, the number of events in the sub-network is the number of nodes having an occurrence of an event in the sub-network. A node having an occurrence of an event refers to a node related to a transaction that is considered as a risky transaction and the node is a risk node. For example, a node in the sub-network is a phone number, and an event occurs for such phone number. The node is considered as a risk node, for example, and a number of events in the sub-network is added by one. Thus, as can be seen, the higher the number of events in the sub-network is, the higher the risk of the sub-network will be.

The embodiments of the present disclosure may configure a set range for the ratio between the number of events and the number of nodes in a sub-network, and if the ratio of the sub-network exceeds the set ratio range, the sub-network is considered to be risky.

S32 determines that a potential risk exists for the transaction to be identified when the set ratio range is exceeded.

If the ratio between the number of events and the number of nodes in the sub-network to which the node relating to the transaction to be identified belongs exceeds the set ratio range, a potential risk exists in the sub-network. Thus, the transaction to be identified is considered to be risky, and the node relating to the transaction to be identified is a risk node.

Figure 4:
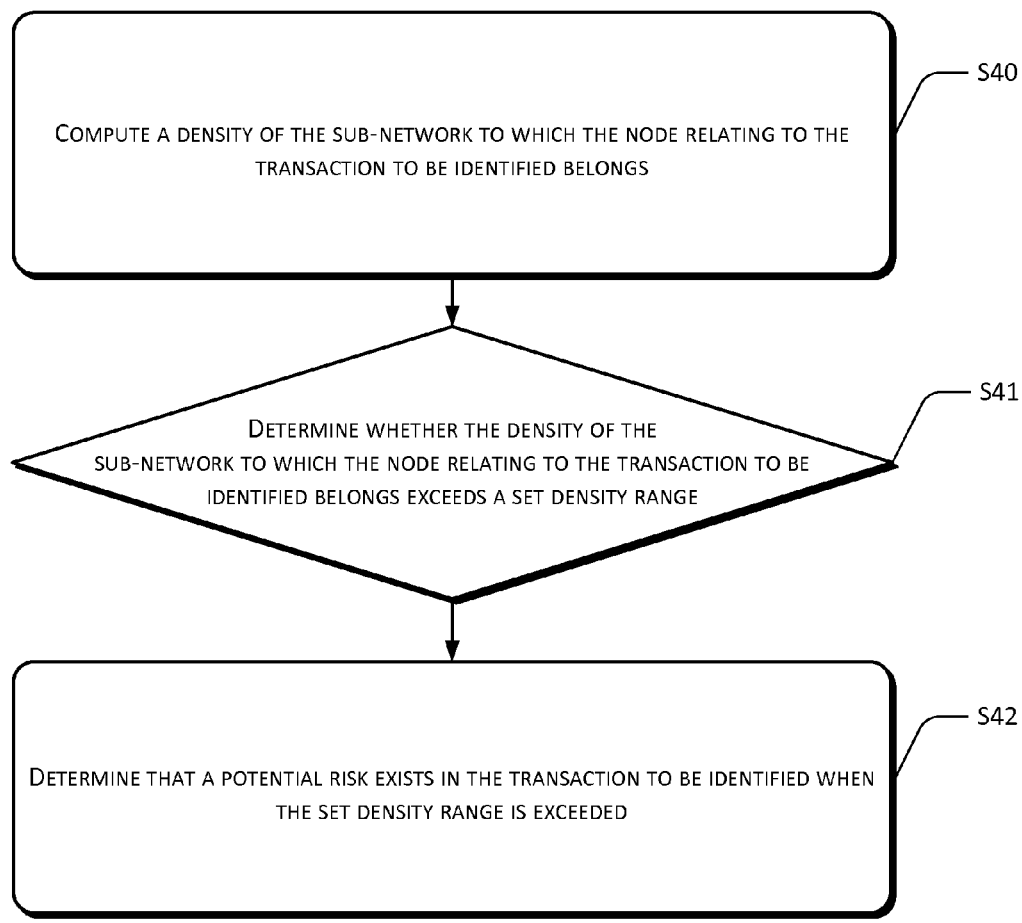
FIG. 4 is another flowchart illustrating operations of identifying a risk of a transaction through a static property of a sub-network to which a node relating to the transaction belongs according to an embodiment of the present disclosure.

In another embodiment of the present disclosure, if the risk identification information of the sub-network, to which the node relating to the transaction to be identified belongs, obtained at S100, includes a static property of the sub-network to which the node relating to the transaction to be identified belongs, the method of identifying the risk of the transaction to be identified based on the risk identification information of the sub-network to which the node relating to the transaction to be identified belongs may include the following blocks as shown in FIG. 4:

S40 computes a density of the sub-network to which the node relating to the transaction to be identified belongs.

For a sub-network where a node relating to a normal transaction belongs, a number of nodes and edges thereof have a certain pattern, and a specific manifestation thereof is a density of such sub-network being within a certain range. For sub-networks having a density exceeding that range, a probability of having a risk becomes higher.

A method of computing a density of a sub-network according to the embodiments of the present disclosure may include: a density of a sub-network=a number of nodes included in the sub-network/a number of edges included in the sub-network.

S41 determines whether the density of the sub-network to which the node relating to the transaction to be identified belongs exceeds a set density range.

The embodiments of the present disclosure set up a set density range for a density of a sub-network. Sub-networks having a density exceeding the set density range are considered to be risky.

S42 determines that a potential risk exists in the transaction to be identified when the set density range is exceeded.

If the density of the sub-network to which the node relating to the transaction to be identified belongs exceeds the set density range, the sub-network is considered to have a potential risk. Furthermore, the transaction to be identified is considered to be risky, and the node relating to the transaction to be identified is a risk node.

In the embodiments of the present disclosure, if the risk identification information of the sub-network to which the node relating to the transaction to be identified belongs obtained at S100 includes dynamic change information of the sub-network caused by the transaction to be identified, the method of identifying the risk of the transaction to be identified based on the risk identification information of the sub-network to which the node relating to the transaction to be identified belongs may include at least one or more of:

(a) determining that a risk exists in the transaction when the transaction to be identified introduces a risk node into a sub-network;

For example, a risk exists in the transaction to be identified if the transaction to be identified introduces a new phone number into a sub-network and the introduced new phone number is considered as a risk node.

(b) determining that a risk exists in the transaction when the transaction to be identified merges sub-networks having a risk.

If the transaction to be identified merges sub-networks having a risk, and at least one of the sub-networks that are merged is a sub-network having a risk, the transaction to be identified is considered to have a risk.

The foregoing descriptions correspond to the method of identifying a risk of a transaction to be identified based on a static property of a sub-network to which a node relating to the transaction to be identified belongs, or the method of identifying a risk of a transaction to be identified based on dynamic change information of a sub-network caused by the transaction to be identified. In a real application, a risk of a transaction may be identified with reference to both a static property of a sub-network to which a node relating to the transaction to be identified belongs and dynamic change information of a sub-network caused by the transaction to be identified.

In addition, after identifying that a risk exists in the transaction to be identified, the embodiments of the present disclosure may label the transaction that is identified as risky, and by labeling the transaction that is identified as risky, further check on the transaction that is identified as risky may be performed at a later stage to determine whether a real risk exists in the transaction. The embodiments of the present disclosure do not impose any limitation on subsequent checking operation. A node relating to a risky transaction is considered as a risk node. The embodiments of the present disclosure may similarly label such risk node.

Furthermore, in response to determining that a risk exists in the transaction to be identified, the embodiments of the present disclosure consider node(s) relating to the transaction to be identified as risk node(s), and further perform a relationship query based on the risk node(s). The purpose of the relationship query includes further checking whether a real risk exists in the risk node(s), and further searching for surrounding risk node(s) that is/are directly or indirectly connected to the risk node(s). A method of performing a relationship query based on a risk node in accordance with the embodiments of the present disclosure may include:

First, nodes which path from the risk node is less than a first set threshold are found to form a collection.

Second, respective shortest paths between the nodes in the collection and nodes in a risk node event library are computed.

According to the embodiments of the present disclosure, the risk node event library stores all nodes having an occurrence of an event.

It can be understood that the above computation operation is not needed for a determined risk node. In other words, this method block only computes the shortest paths between the nodes (except the risk node) in the collection and the nodes in the risk node event library.

Finally, a statistics is conducted, and a determination is made as to whether a number of the shortest paths between the nodes in the collection and the nodes in the risk node event library that are less than a second set threshold reaches a third set threshold.

If the third set threshold is reached, the node is a risk node.

For ease of understanding, an example of performing a relationship query based on a risk node a is used for illustration, with an assumption that the first set threshold is three, the second set threshold is four, and the third set threshold is five. Details of operations are as follows:

First, nodes which path from the risk node a is less than three are found to form a collection A. The collection A is assumed to include nodes: a, b, c, and d.

Then, respective shortest paths between the nodes b, c and d in the collection A and nodes in the risk node event library are calculated. The risk node event library is supposed to include ten nodes.

The respective shortest paths between the nodes b, c and d in the collection A and the ten nodes in the risk node event library are calculated individually.

Finally, a statistics is conducted and a determination is made as to whether a number of the shortest paths between the nodes b, c and d and the ten nodes in the risk node event library that are less than four exceeds five. If a number of shortest paths between the node b and the ten nodes in the risk node event library that are less than four is three, a number of shortest paths between the node c and the ten nodes in the risk node event library that is less than four is one, and a number of shortest paths between the node d and the ten nodes in the risk node event library that are less than four is six, the number of the shortest paths between the node d and the ten nodes in the risk node event library that are less than four exceeds five. Therefore, the node d is considered as a risk node.

The embodiments of the present disclosure build up entities and behaviors relating to a transaction to be identified into a relationship network, and identify whether the transaction to be identified has a risk using risk identification information of the network. Since the risk identification information of the network is difficult to be found or changed, the embodiments of the present disclosure can identify a transaction risk in a more effective way.

Furthermore, by building the entities and behaviors relating to the transaction into the relationship network, the embodiments of the present disclosure can comprehensively identify a transaction risk when performing transaction risk identification.

In addition, the embodiments of the present disclosure can maintain a serial number of a sub-network number to be steady when the sub-network experiences a dynamic change, thus facilitating a relationship query.

The foregoing method for identifying a transaction risk according to the present disclosure may be performed by a terminal, a software installed on the terminal, or a server.

It should be noted that the method blocks of the example method may be performed by a same device or different devices.

Figure 5:
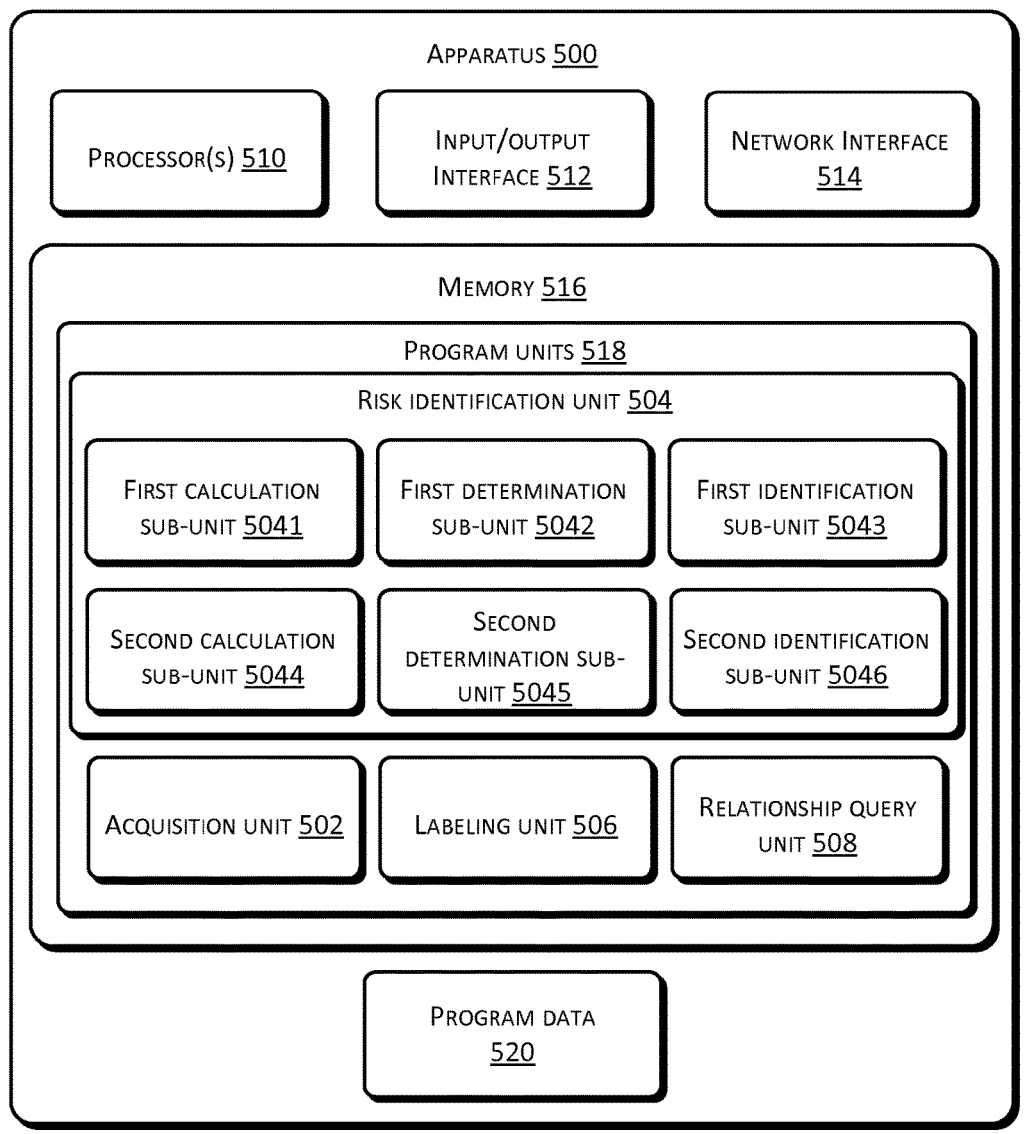
FIG. 5 is a structural schematic diagram of an apparatus of identifying a transaction risk according to an embodiment of the present disclosure.

The method for identifying a transaction risk according to the embodiment of the present disclosure has been described above. Based on the same concept, the embodiments of the present disclosure further provide an apparatus 500 for identifying a transaction risk, as shown in FIG. 5, which is a structural schematic diagram of the apparatus 500. In one embodiment, the apparatus 500 may include an acquisition unit 502 and a risk identification unit 504. Additionally, in other embodiments, the apparatus 500 may further include a labeling unit 506 and a relationship query unit 508.

The acquisition unit 502 is used for obtaining risk identification information of a sub-network to which a node relating to a transaction to be identified belongs, the risk identification information of the sub-network including a static property of the sub-network and/or dynamic change information of the sub-network caused by the transaction to be identified.

The sub-network is a network acquired by partitioning a relationship network based on connectivity. The relationship network is a network built up with entities and activities relating to a plurality of transactions. The entities relating to the plurality of transactions are used as nodes in the relationship network, and the activities relating to the plurality of transactions are used as edges for connecting the nodes in the relationship network. The method of building the relationship network and the method of partitioning the relationship network into a plurality of sub-networks, as well as the static property and the dynamic change information of the sub-network are the same as those described in the above embodiments, which are not repeatedly described herein.

The embodiments of the present disclosure may build entities and activities relating to a plurality of transactions into a relationship network, which helps identifying a transaction in a comprehensive manner during transaction risk identification.

The risk identification unit 504 is used for identifying a risk of the transaction to be identified based on the risk identification information of the sub-network to which the node relating to the transaction to be identified belongs.

In an embodiment of the present disclosure, the risk identification unit 504 may include:
- a first calculation sub-unit 5041 to calculate a ratio between a number of events and a number of nodes in the sub-network to which the node relating to the transaction to be identified belongs;
- a first determination sub-unit 5042 to determine whether the ratio between the number of events and the number of nodes in the sub-network to which the node relating to the transaction to be identified belongs that is calculated by the first calculation sub-unit 5041 exceeds a set ratio range;
- a first identification sub-unit 5043 to identify that a potential risk exists in the transaction to be identified in response to the first determination sub-unit 5041 determining that the ratio exceeds the set ratio range.

In another embodiment of the present disclosure, the risk identification unit 504 may include:
- a second calculation sub-unit 5044 to calculate a density of the sub-network to which the node relating to the transaction to be identified belongs;
- a second determination sub-unit 5045 to determine whether the density of the sub-network to which the node relating to the transaction to be identified belongs that is calculated by the second calculation sub-unit 5044 exceeds a set density range;
- a second identification sub-unit 5046 to determine that a potential risk exists in the transaction to be identified in response to the second determination sub-unit 5045 determining that the density of the sub-network to which the node relating to the transaction to be identified belongs exceeds the set density range.

In an embodiment of the present disclosure, the risk identification unit 504 may identify that a risk exists in the transaction to be identified in any one or more situations as follows:
- the transaction to be identified introducing a risk node into the sub-network; or
- the transaction to be identified merging sub-networks having a risk.

It can be understood that the risk identification unit 504 may identify a risk of a transaction to be identified based on a static property of a sub-network to which a node relating to the transaction to be identified belongs, or identify a risk of the transaction to be identified based on dynamic change information of the sub-network caused by the transaction to be identified, and in a real application, may also identify a risk of the transaction to be identified by referencing both the static property of the sub-network to which the node relating to the transaction to be identified belongs and the dynamic change information of the sub-network caused by the transaction to be identified. If the risk identification unit 504 determines that a risk exists in the transaction to be identified, the node relating to the transaction to be identified is a risk node.

Optionally, in an embodiment of the present disclosure, the apparatus 500 for identifying a transaction risk may further include a labeling unit 506 to label a transaction having a risk.

By labeling a transaction having a risk, the embodiments of the present disclosure can facilitate further check on the transaction having the risk subsequently to determine whether a real risk exists.

Optionally, in an embodiment of the present disclosure, the apparatus 500 for identifying a transaction risk may further include a relationship query unit 508 to perform a relationship query based on a risk node in the transaction to be identified in response to the risk identification unit 504 determining that a potential risk exists in the transaction to be identified.

A method used by the relationship query unit 508 to perform a relationship query is the same as that described in the foregoing method embodiment, which is not repeatedly described herein.

In short, the embodiments of the present disclosure builds up entities and behaviors relating to a transaction to be identified into a relationship network, and identify whether a risk exists in the transaction to be identified using risk identification information of the network. Since the risk identification information of the network is difficult to be found or changed, the embodiments of the present disclosure can identify a transaction risk in a more effective manner.

Furthermore, by building the entities and behaviors relating to the transaction into the relationship network, the embodiments of the present disclosure can identify the risk of the transaction in a comprehensive manner during transaction risk identification.

In addition, when a dynamic change occurs in a sub-network, the embodiments of the present disclosure can maintain a serial number of the sub-network to be steady, thus facilitating a relationship query.

One skilled in the art should understand that the embodiments of the present disclosure can be provided as a method, a system or a product of a computer program. Therefore, the present disclosure can be implemented as an embodiment of hardware only, an embodiment of software only, or an embodiment of a combination of hardware and software. Moreover, the present disclosure can be implemented as a product of a computer program that can be stored in one or more computer readable storage media (which includes but is not limited to, a magnetic disk, a CD-ROM or an optical disk, etc.) that store computer-executable instructions.

The present disclosure is described in accordance with flowcharts and/or block diagrams of the exemplary methods, apparatuses (systems) and computer program products. It should be understood that each process and/or block and combinations of the processes and/or blocks of the flowcharts and/or the block diagrams may be implemented in the form of computer program instructions. Such computer program instructions may be provided to a general purpose computer, a special purpose computer, an embedded processor or another processing apparatus having a programmable data processing device to generate a machine, so that an apparatus having the functions indicated in one or more blocks described in one or more processes of the flowcharts and/or one or more blocks of the block diagrams may be implemented by executing the instructions by the computer or the other processing apparatus having programmable data processing device.

Such computer program instructions may also be stored in a computer readable memory device which may cause a computer or another programmable data processing apparatus to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing apparatus, so that a series of operations may be executed by the computer or the other data processing apparatus to generate a computer implemented process. Therefore, the instructions executed by the computer or the other programmable apparatus may be used to implement one or more processes of the flowcharts and/or one or more blocks of the block diagrams.

In an embodiment, the apparatus 500 may include one or more computing devices. In an embodiment, the apparatus 500 may include one or more processors 510, an input/output interface 512, a network interface 514 and memory 516.

The memory 516 may include a form of computer readable media such as volatile memory, Random Access Memory (RAM), and/or non-volatile memory, e.g., Read-Only Memory (ROM) or flash RAM, etc. The memory 516 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 516 may include program units 518 and program data 520. The program units 518 may include one or more units and sub-units as described in the foregoing embodiments. Details of these units and sub-units have been described in the foregoing embodiments, and are therefore not repeatedly described herein.

It should also be noted that terms such as "comprise", "include" or any other variations thereof are meant to cover the non-exclusive inclusions. The process, method, product or apparatus that includes a series of elements not only includes those elements, but also includes other elements that are not explicitly listed, or further includes elements that already existed in such process, method, product or apparatus. In a condition without further limitations, an element defined by the phrase "include a/an . . . " does not exclude any other similar elements from existing in the process, method, product or apparatus.

One skilled in the art should understand that the embodiments of the present disclosure can be provided as a method, a system or a computer program product. Therefore, the present disclosure can be implemented as an embodiment of only hardware, an embodiment of only software or an embodiment of a combination of hardware and software. Moreover, the present disclosure can be implemented as a computer program product that may be stored in one or more computer readable storage media (which includes but is not limited to, a magnetic disk, a CD-ROM or an optical disk, etc.) that store computer-executable instructions.

The above descriptions are merely exemplary embodiments of the present disclosure, and are not intended to limit the present disclosure. For one skilled in the art, the present disclosure may have various modifications and changes. Any modifications, equivalent replacements and improvements, etc., made within the spirit and principle of the present disclosure should be included in the scope of protection of the claims in the present disclosure.

The invention claimed is:

1. A method implemented by one or more computing devices, the method comprising:
   building a relationship network with entities and activities relating to a plurality of transactions;
   partitioning the relationship network, in real time or at fixed intervals, into a plurality of unconnected sub-networks based on connectivity by:
     comparing current node information and historical node information to determine and label node change information,
     processing the deleted and split sub-networks using the node change information, and
     processing newly added and merged sub-networks using the node change information;
   acquiring a sub-network, to which a node relating to a transaction to be identified belongs, the transaction being one of the plurality of transactions;
   obtaining risk identification information of the sub-network to which the node relating to the transaction to be identified belongs, the risk identification information of the sub-network including one or more of a static property of the sub-network, and dynamic change information of the sub-network that is caused by the transaction to be identified;
   identifying a risk of the transaction to be identified based at least in part on the risk identification information of the sub-network to which the node relating to the transaction to be identified belongs; and
   labeling the node relating to the transaction to be identified belongs as a risk node.

2. The method of claim 1, wherein the entities relating to the plurality of transactions are used as nodes in the relationship network, and the activities relating to the plurality of transactions are used as edges for connecting the nodes in the relationship network.

3. The method of claim 1, wherein each sub-network has a serial number that is unique in the relationship network, and the method further includes keeping a serial number of the sub-network steady if a dynamic change occurs in the sub-network.

4. The method of claim 3, wherein keeping the serial number of the sub-network steady comprises one or more of:
   generating a random number that is unique to the relationship network for a first sub-network in response to adding the first sub-network into the relationship network;
   deleting a serial number of a second sub-network in response to deleting the second sub-network from the relationship network;
   enabling a serial number of a third sub-network to inherit a serial number of a largest sub-network of at least two sub-networks in response to merging the at least two sub-networks in the relationship network; and
   enabling a serial number of a sub-network that is largest among a plurality of sub-networks to inherit a serial number of a fourth sub-network in response to splitting the fourth sub-network into the plurality of sub-network in the relationship network.

5. The method of claim 1, further comprising conducting a relationship query in the relationship network in response to determining that a potential risk exists in the transaction to be identified.

6. The method of claim 1, wherein the entities relating to the plurality of transactions comprise one or more of: a user identifier (ID), a delivery address, a phone number, a bank card used in a particular transaction, a Unique Material Identifier (UMID) and a Media Access Control (MAC) address.

7. The method of claim 1, wherein the activities relating to the plurality of transactions include at least one or more of an activity associated with a particular transaction, an activity associated with registration and an activity associated with login.

8. The method of claim 1, wherein the static property of the sub-network includes one or more of: a number of nodes in the sub-network, a number of edges in the sub-network, a number of events in the sub-network, and a number of paths where a shortest path between any two nodes in the sub-network is less than a set threshold.

9. The method of claim 1, wherein identifying the risk of the transaction to be identified includes:
   calculating a ratio between a number of events and a number of nodes in the sub-network to which the node relating to the transaction to be identified belongs; and
   determining whether the ratio between the number of events and the number of nodes in the sub-network to which the node relating to the transaction to be identified belongs exceeds a set ratio range.

10. The method of claim 9, further comprising determining that a potential risk exists in the transaction to be identified in response to determining that the ratio between the number of events and the number of nodes in the sub-network to which the node relating to the transaction to be identified belongs exceeds the set ratio range.

11. The method of claim 1, wherein identifying the risk of the transaction to be identified includes:
   calculating a density of the sub-network to which the node relating to the transaction to be identified belongs; and
   determining whether the density of the sub-network to which the node relating to the transaction to be identified belongs exceeds a set density range.

12. The method of claim 11, further comprising determining that a potential risk exists in the transaction to be identified in response to determining that the density of the sub-network to which the node relating to the transaction to be identified belongs exceeds the set density range.

13. The method of claim 1, wherein identifying the risk of the transaction to be identified includes one or more of:
   determining that the risk exists in the transaction to be identified when the transaction to be identified introduces a risk node into the sub-network; and
   determining that the risk exists in the transaction to be identified when the transaction to be identified merges sub-networks having the risk.

14. The method of claim 1, wherein the dynamic change information of the sub-network includes information of one or more of: a new sub-network addition, a sub-network deletion, a sub-network merging and a sub-network splitting.

15. An apparatus comprising:
one or more processors; and
memory coupled to the one or more processors, the memory storing a plurality of units executable by the one or more processors, the plurality of units including:
an acquisition unit configured to obtain risk identification information of a sub-network to which a node relating to a transaction to be identified belongs, the risk identification information of the sub-network including one or more of a static property of the sub-network, and dynamic change information of the sub-network that is caused by the transaction to be identified;
a risk identification unit configured to identify a risk of the transaction to be identified based on the risk identification information of the sub-network to which the node relating to the transaction to be identified belongs; and
a labeling unit configured to label the transaction as having the risk and to label the node relating to the transaction to be identified belongs as a risk node,
wherein the sub-network is a network acquired by partitioning a relationship network, in real time or at fixed intervals, into a plurality of unconnected sub-networks based on connectivity, and the relationship network is a network built up from entities and activities relating to a plurality of transactions.

16. The apparatus of claim 15, wherein the entities relating to the plurality of transactions are used as nodes in the relationship network, and the activities relating to the plurality of transactions are used as edges for connecting the nodes in the relationship network.

17. The apparatus of claim 15, wherein the static property of the sub-network includes one or more of: a number of nodes in the sub-network, a number of edges in the sub-network, a number of events in the sub-network, and a number of paths where a shortest path between any two nodes in the sub-network is less than a set threshold.

18. The apparatus of claim 17, wherein the risk identification unit includes:
a first calculation sub-unit configured to calculate a ratio between the number of events and the number of nodes in the sub-network to which the node relating to the transaction to be identified belongs;
a first determination sub-unit configured to determine whether the ratio of the number of events and the number of nodes in the sub-network to which the node relating to the transaction to be identified belongs that is calculated by the first calculation sub-unit exceeds a set ratio range; and
a first identification sub-unit configured to identify that a potential risk exists in the transaction to be identified in response to the first determination sub-unit determining that the ratio exceeds the set ratio range.

19. One or more computer-readable media storing executable instructions that, when executed by one or more processors, cause the one or more processors to perform acts comprising:
building a relationship network with entities and activities relating to a plurality of transactions;
partitioning the relationship network, in real time or at fixed intervals, into a plurality of unconnected sub-networks based on connectivity by:
comparing current node information and historical node information to determine and label node change information,
processing the deleted and split sub-networks using the node change information, and
processing newly added and merged sub-networks using the node change information;
acquiring a sub-network, to which a node relating to a transaction to be identified belongs, the transaction being one of the plurality of transactions;
obtaining risk identification information of the sub-network to which the node relating to the transaction to be identified belongs, the risk identification information of the sub-network including one or more of a static property of the sub-network, and dynamic change information of the sub-network that is caused by the transaction to be identified;
identifying a risk of the transaction to be identified based at least in part on the risk identification information of the sub-network to which the node relating to the transaction to be identified belongs, identifying the risk of the transaction to be identified including:
upon identifying that the risk identification information of the sub-network includes the static property of the sub-network,
calculating a ratio between a number of events and a number of nodes in the sub-network to which the node relating to the transaction to be identified belongs,
determining whether the ratio between the number of events and the number of nodes in the sub-network to which the node relating to the transaction to be identified belongs exceeds a set ratio range, and
determining that a potential risk exists in the transaction to be identified in response to determining that the ratio between the number of events and the number of nodes in the sub-network to which the node relating to the transaction to be identified belongs exceeds the set ratio range; and
upon identifying that the risk identification information of the sub-network includes the dynamic change information of the sub-network that is caused by the transaction to be identified,
calculating a density of the sub-network to which the node relating to the transaction to be identified belongs,
determining whether the density of the sub-network to which the node relating to the transaction to be identified belongs exceeds a set density range, and
determining that the potential risk exists in the transaction to be identified in response to determining that the density of the sub-network to which the node relating to the transaction to be identified belongs exceeds the set density range; and
labeling the node relating to the transaction to be identified belongs as a risk node.

20. The one or more computer-readable media of claim 19, wherein the entities relating to the plurality of transactions are used as nodes in the relationship network, and the activities relating to the plurality of transactions are used as edges for connecting the nodes in the relationship network.

* * * * *